No Printed Specification Available
9291X
U. Ward,
Brick Machine.
Patented Dec. 15, 1835.
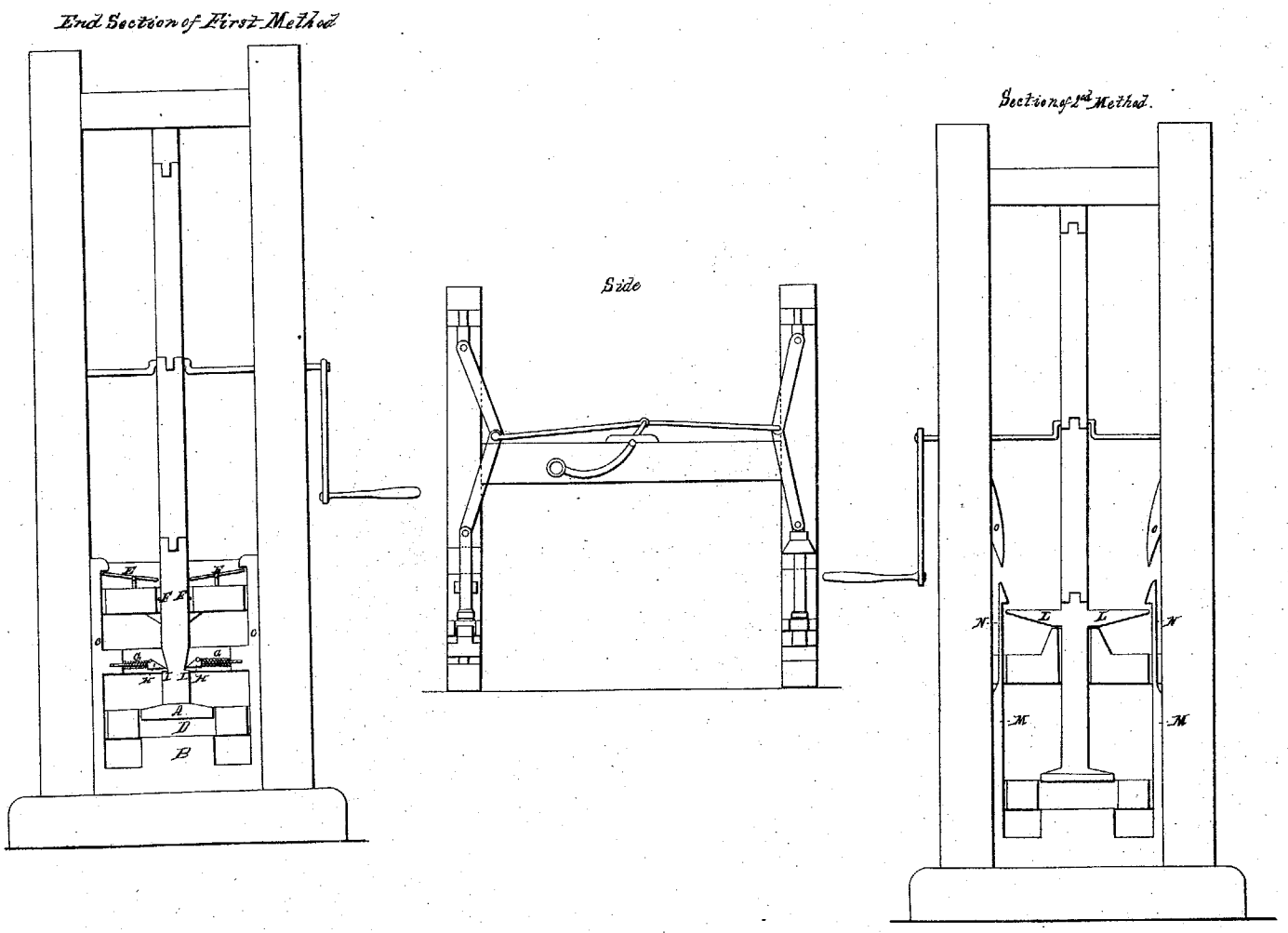
AM. PHOTO-LITHO. CO. N.Y. (OSBORNE'S PROCESS)

9241X

Dec. 15. 1835

Ulysses Ward of Washington City D. C.

Letters Patent.

The Schedule referred to in these Letters Patent and making part of the same containing a descrip-
tion in the words of the said Ulysses Ward himself of his improvement in the machine for pres-
sing and delivering bricks and other substances To all to whom these presents shall come: Be it known that I Ulys-
ses Ward of the City of Washington and District of Columbia have invented a new and useful
improvement in the manner of Pressing and delivering Bricks according to the plan set forth
by Nathan Sawyer in his Patent bearing date on the 8th of April Eighteen Hundred & thirty
five. My said improvement not being confined to the manufacture of bricks but intended to
be used for all substances or composition of matter requiring to be so pressed and delivered
such as Hay, Cotton &c. My object is to simplify his construction in the pressing part
so as to dispense with the combination of wheels by which he conducts the power from the
power from the main axle or crank to the shaft containing the cams: and also the lev-
ers by which he continues the power from them to the rods communicating with the
moulds below. I also simplify the delivering part by making an omission of the same
portions and apply in the place thereof an arrangement near the lower part of the pressing
piston which I shall proceed to describe. I would have it understood that the
pressing process which I simplify, is not that effected by the downward motion of the
pressing piston. that being done by the crank and toggle joints. which I do not touch. but I
speak of that pressure which he can produce by raising from below so as to cause the follower
of the mould to meet the piston. which effect according to my plan by first cutting the sli-
ding rods communicating with the mould follower at a point just above the top bar by
which they are guided in their passage up and down, this end thus cut off I bend over
towards the pressing piston so as to form a square shoulder intended to receive (as a catch)
the end of a short lever which I place horizontally extending from said shoulder to the pres-
sing Piston where it again catches upon a small knob or cog projecting from the side of the
said piston. & which may be an increased length of the pivot forming a joint thereof.
The lever I support at its proper height above the top bar referred to by means of a perpendic-
ular inserted there for that purpose having a pivot on which said lever is to turn.
The piston in descending strikes by the cog against one end of the lever and carries it down
the other which is under the catch or shoulder in the sliding rod is consequently made to

9291X bear it up until released from the cog at the piston this of course brings up the follower in the
mould, which is connected with the rods and meets the pressure on top of the bricks which
will be found a great advantage in the manufacture. But that upon which I attach
the greatest value is the manner I devise to raise the follower after the pressure is accom-
plished in order to deliver the finished Brick from the mould, which I thus perform.
Beneath the top Bar already mentioned in which the rods slide up and down, I place
another horizontal bar from one to the other and secure thereto so as to move with them
which with that at the bottom of the same stand for the follower constitutes a frame
to be raised by a contrivance attached to the first of these two horizontal bars consist-
ing of an excavation in the lower side in which I place between the piston and rods a spring
(a spiral one answers well) having secured to the end next the piston a wedge so as that it shall
slide either way as the spring contracts or dilates. a similar one occupies the other side of the
piston. Now through the horizontal bar is formed a hole for the passage of the piston, &
at the edge there of these sliding wedges rest when the spring is contracted to its usual ex-
tent though projecting inwards sufficiently to render it necessary that they should recede before
the piston can descend. or in other words they constantly press against its sides so that when the
descent has been sufficient to effect the pressure and the piston raised enough to free it from the
brick, a notch or shoulder cut into the sides of the piston opposite to the wedges allows them to enter
by the dilation of the spring and consequently (for the time) raises the horizontal bars and
rods with the piston until the brick is delivered at the proper height. when the wedges come
in contact with the two other stationary ones attached to the lower side of the top station-
ary bar. through which the rods slide and applied close to the sides of the piston so that as they are
insinuated between them and the sliding wedges when arrived at the required altitude which
of course loosens their hold, the frame and horizontal bars fall to their proper situation, leaving
the mould open for another charge of clay. This method of delivery I call the first and esteem
it the best. but have another mode of application to produce the same result. thus instead
of springs and wedges and notch in the piston I simply continue the cog or knob mentioned
in the joint. so as to form a long bar having the ends of a triangular shape, with one edge
pointing downwards. the top side to be horizontal. These are brought directly over the short-
ened rods which instead of the shoulder or catch already described have the tops fashioned into the
shape of two shoulders upon elastic shanks placed on opposite sides, and with such
a gradual diminution towards the top as to allow the triangular edged wedge in descending
with the piston to enter between them and displace or spread them so as to pass through when by their elasticity they close and present the shoulders to the horizontal top which is done at the time the pressing is effected. when by the return upwards of the piston the long bar brings the rods, with it and consequently delivers the brick as before. But to produce the fall of the rods they must be released from the bar. Which is done by securing at each side of the upright of the frame enclosing the machinery and directly over the ends of the rods a projection having on its under surface a wedged shape of sufficient width to force open the tops of the rods so as to release the bar when it immediately falls as before and presents the mould for a fresh charge. It will be seen that by this second method I do not press from below but simply deliver the brick, which I principally aim at (by the means above described) as a much more simple method than that used by the said Nathan Sawyer and thereby making a very considerable diminution in the expense. What I claim as my invention & not previously known in the above described improvement & for which I ask letters Patent is simply the manner of construction by which I effect the delivery of the Brick in the return of the piston itself by the instrumentality of the springs & wedges attaching the mould frame thereto and the manner of releasing it by the wedges. as set forth in the first mode of application. also I claim the second described mode of application consisting of the arrangement of the triangular ended bar working into the elastic catches as described to produce the same effect of delivering as the first mode. Finally the mode of construction I used in the first method to produce a pressure from below the mould by the arrangement of the horizontal lever and its communication from the piston to the rods as shewn.

In testimony that the above is a full description of my improvement as invented by me I have hereunto set my hand this twenty first day of November in the year 1835.

Witnesses B. K. Morell
G. L. Peterson

U. Ward

Recd.
[illegible]

1566 words (Patented 15 Decr 1835)

Drawing made